F. C. AREY.
APPARATUS FOR MANUFACTURE OF EXPANDED METAL.
APPLICATION FILED SEPT. 3, 1920.
1,412,156.
Patented Apr. 11, 1922.
6 SHEETS—SHEET 1.
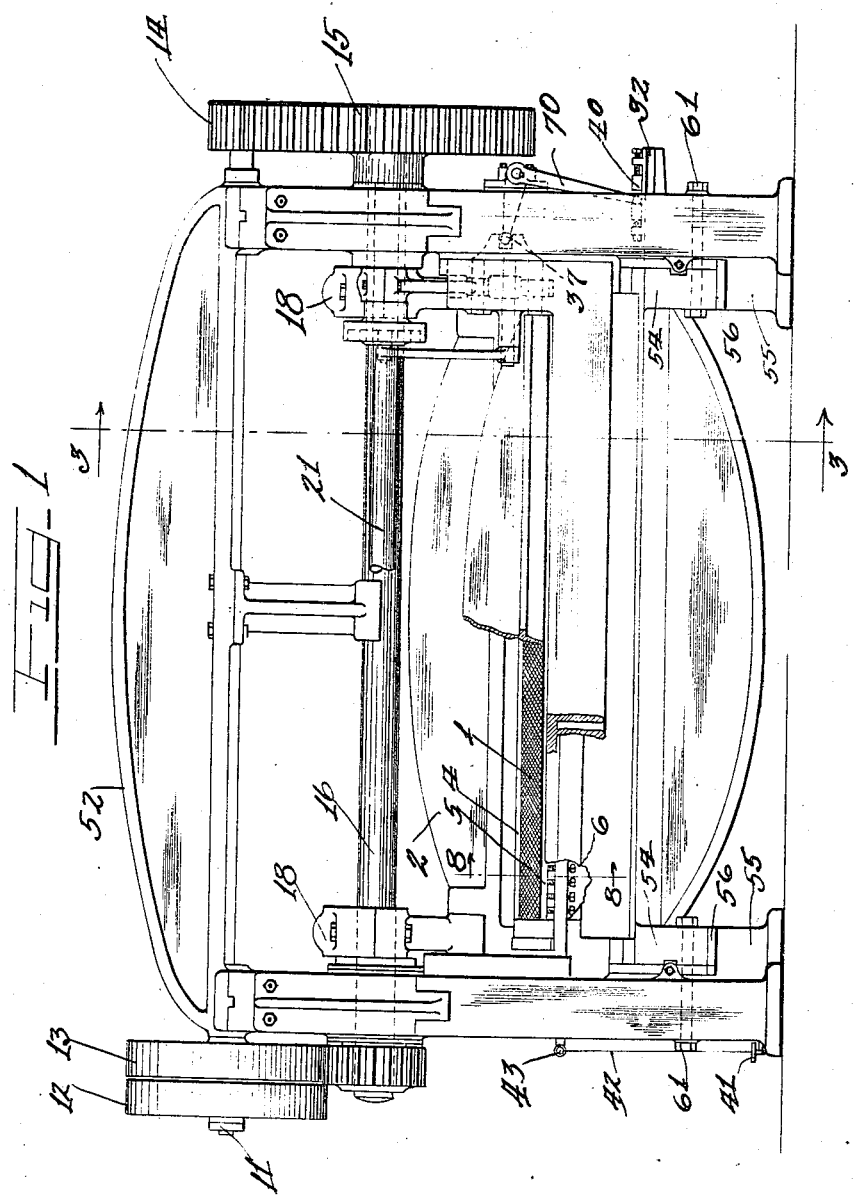

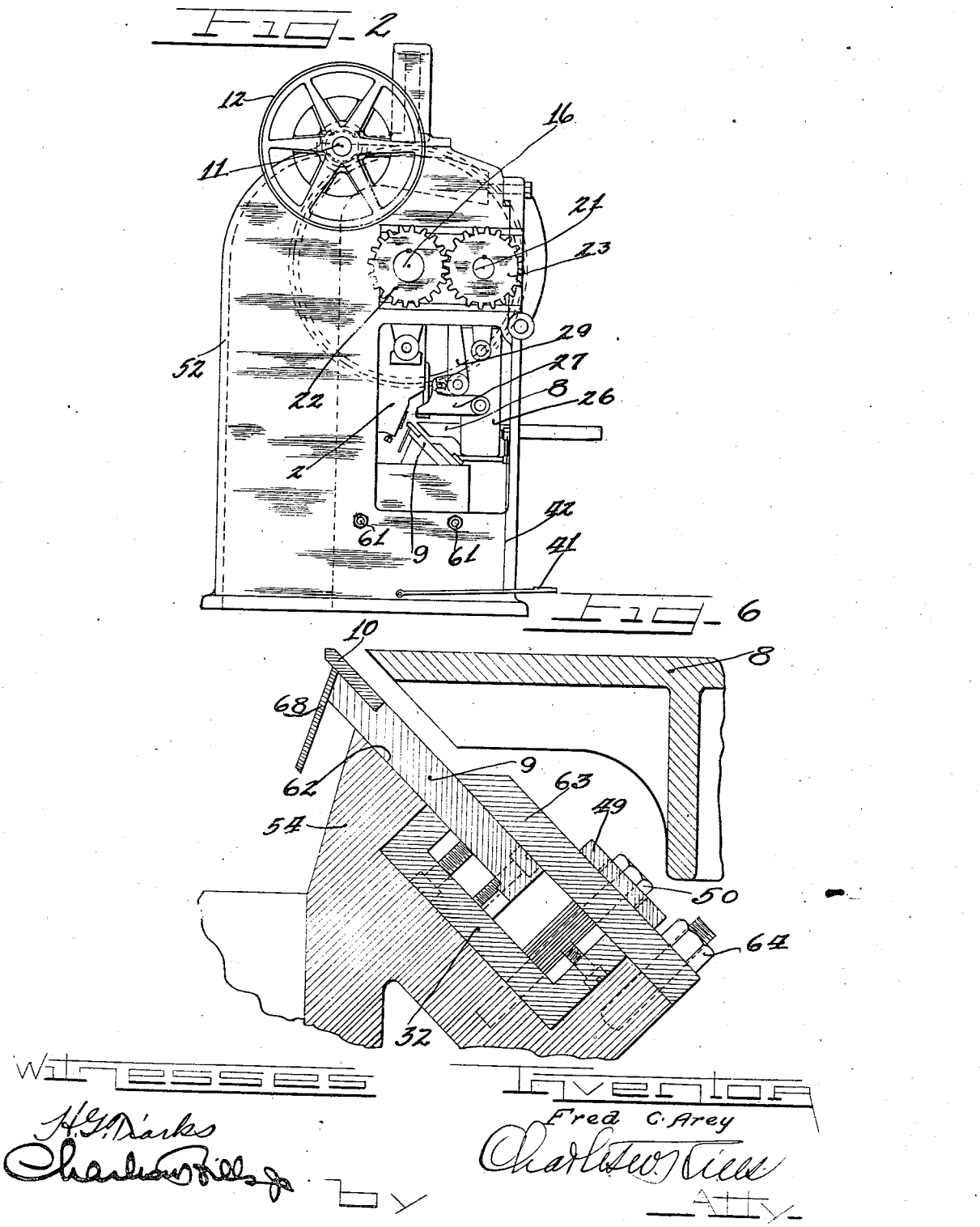

F. C. AREY.
APPARATUS FOR MANUFACTURE OF EXPANDED METAL.
APPLICATION FILED SEPT. 3, 1920.
1,412,156.
Patented Apr. 11, 1922.
6 SHEETS—SHEET 3.
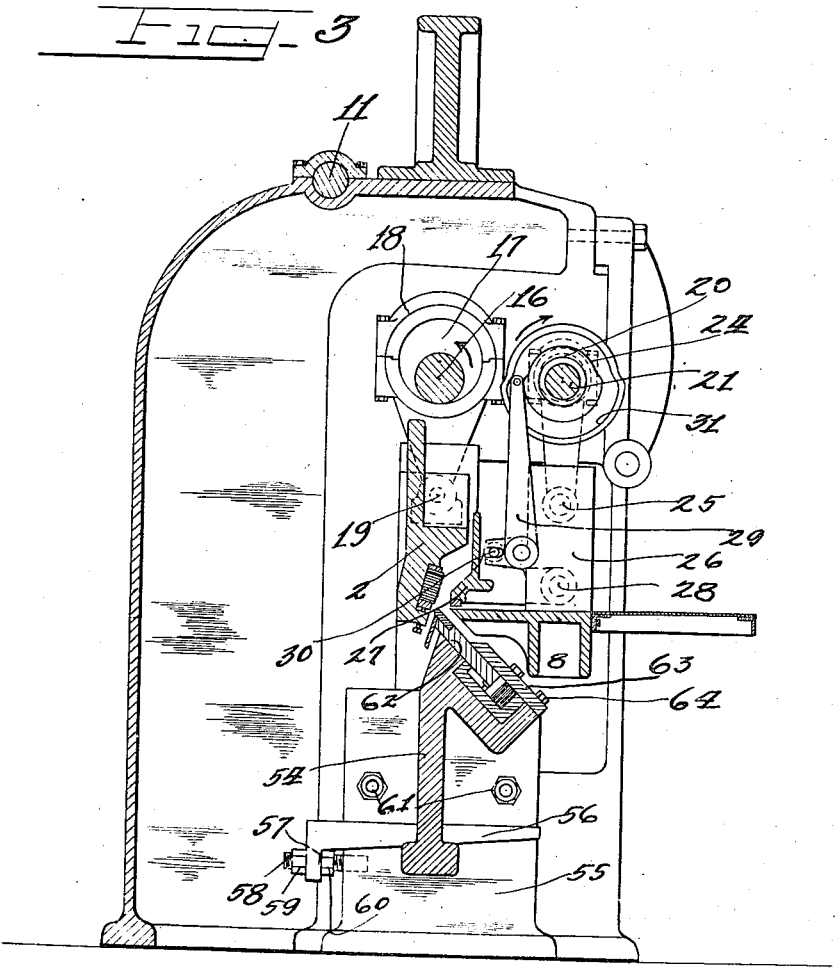

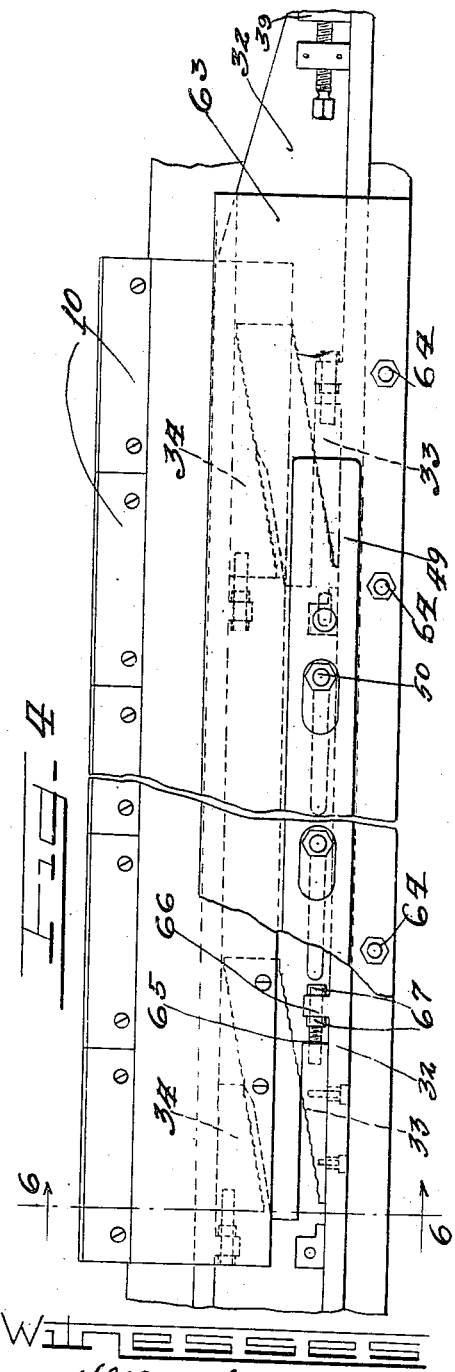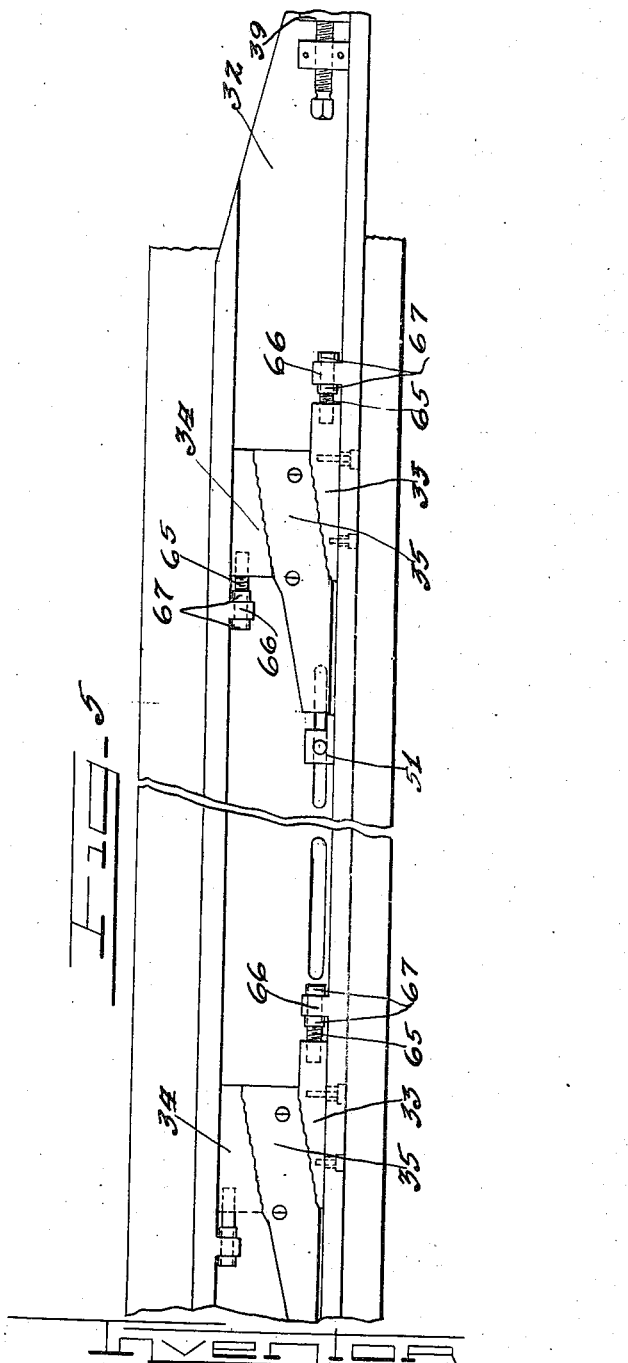

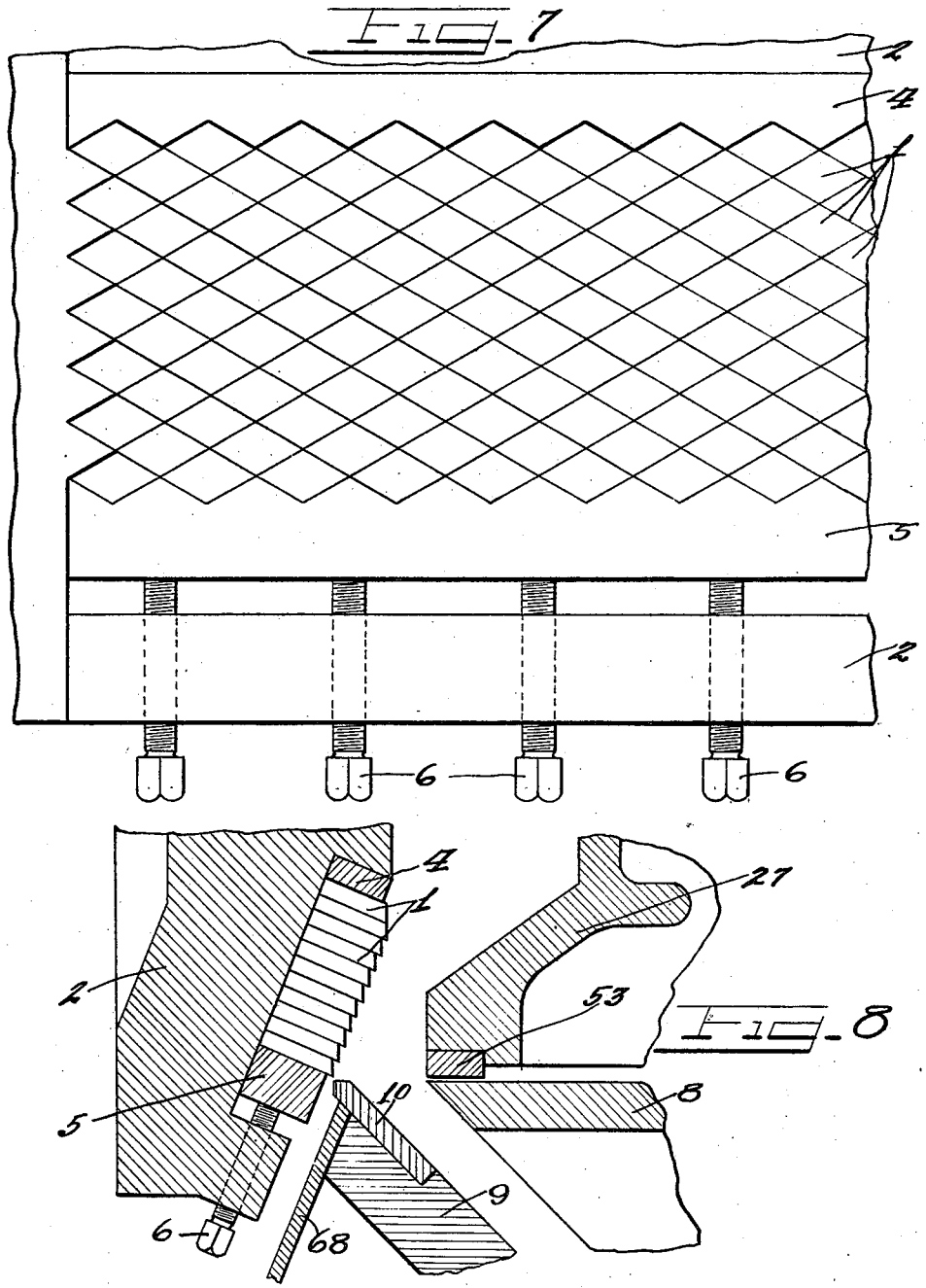

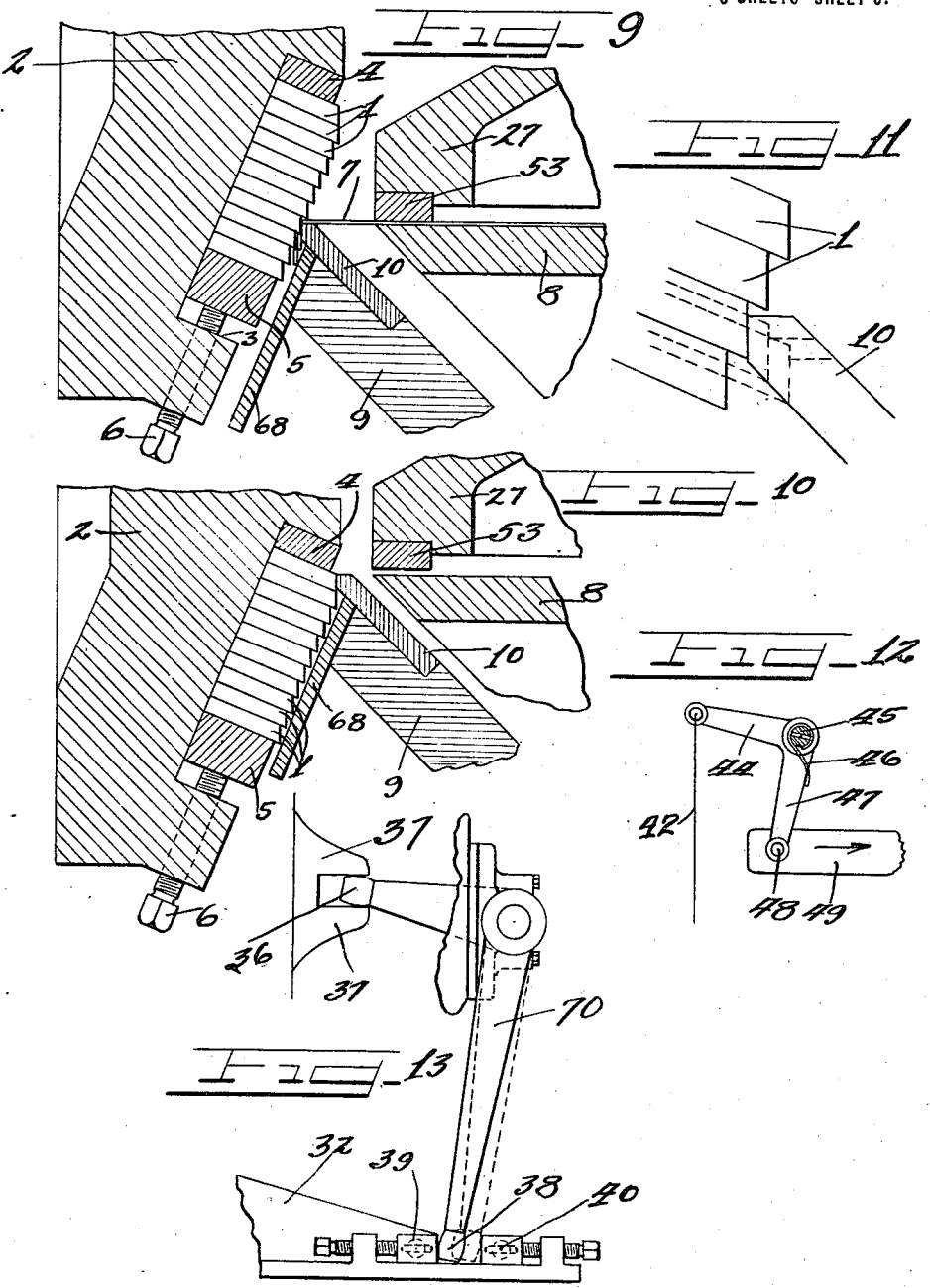

UNITED STATES PATENT OFFICE.

FRED C. AREY, OF OAK PARK, ILLINOIS.

APPARATUS FOR MANUFACTURE OF EXPANDED METAL.

1,412,156.  Specification of Letters Patent.  Patented Apr. 11, 1922.

Application filed September 3, 1920. Serial No. 407,913.

*To all whom it may concern:*

Be it known that I, FRED C. AREY, a citizen of the United States, and a resident of the village of Oak Park, in the county of Cook and State of Illinois, have invented certain new and useful Improvements in an Apparatus for Manufacture of Expanded Metal; and I do hereby declare that the following is a full, clear, and exact description of the same, reference being had to the accompanying drawings, and to the numerals of reference marked thereon, which form a part of this specification.

This invention relates to apparatus for the manufacture of expanded metal lath and other articles, more particularly by expanding the metal in a direction perpendicular to one of the edges of the sheet as distinguished from those processes wherein the metal is expanded diagonally to one side of the sheet.

It is an object of the invention to provide a simple, readily operated machine for expanding metal sheets.

It is also an object of the invention to provide a machine which will operate on a wide sheet of material and cut the same off whenever desired.

Other and further important objects of this invention will be apparent from the disclosures in the drawings and specification.

The invention (in a preferred form) is illustrated in the drawings and hereinafter more fully described.

On the drawings:

Figure 1 is a front elevation, with parts broken away, of a machine embodying the features of the present invention.

Figure 2 is an end view of the same.

Figure 3 is a section on the line 3—3 of Figure 1.

Figure 4 is a plan view of one of the members which supports the strip whilst it is being expanded.

Figure 5 is a view similar to Figure 4 with parts removed.

Figure 6 is a section on the line 6—6 of Figure 4.

Figure 7 is an end view of the cutter bars and a portion of the frame in which they are arranged.

Figure 8 is a section on the line 8—8 of Figure 1.

Figure 9 is a view similar to Figure 8 showing the parts during the cutting operation.

Figure 10 is a view showing the parts in the position they assume when the strip is cut off.

Figure 11 is an enlarged view of the ends of some of the cutters and the support with which they co-operate to form the meshes in the sheet.

Figure 12 is a detail view of one part of the cutting-off mechanism.

Figure 13 is a detail view showing one part of the mechanism for operating the sheet support.

As shown on the drawings:

The apparatus illustrated is adapted to expand the metal in a direction parallel to the edges of the sheet operated on so that in the operation of forming the mesh the metal is stretched so as to give an expanded sheet of the same length but greater width than the original sheet. The cutting of the meshes in the sheet is brought about by a series of cutter bars 1, each having the same cross-section as the meshes in the sheet mounted on a vertically reciprocating frame 2. For this purpose the frame 2 is provided with a recess 3 along the upper and lower edges of which are arranged bars 4 and 5, respectively, having notched surfaces to receive the longitudinal edges of the cutter bars, as shown more particularly in Figure 7. Clamp screws 6 force the bar 5 firmly against the cutter bars so as to hold them in position. The ends of each cutter bar are formed so that when clamped in position on the frame 2, its end face is substantially vertical and its lower edges overhang the upper edges of the bar immediately below it. Consequently, as each row of cutters descends onto the plate a fresh strip of metal is engaged each time to form one half of a new series of meshes and to complete the series of meshes begun by the previous row of cutters.

By providing separate cutter bars the grinding of the cutting edges is facilitated and the bars may be used until they become too short to be held in place between the bars 4 and 5. Further, as the bars are detachable they may be replaced by larger or smaller bars to produce larger or smaller meshes in the expanded metal. It is necessary to support the metal immediately behind the cutter bars as the latter move into contact therewith in order to obtain the desired shearing action. For this purpose a support 9 is provided having a hardened steel strip 10 along its upper margin which coacts with the cutter bars in their shearing action. An apron strip 68 is also attached to the upper edge of the support 9 to guide the completed expanded metal. Means are provided whereby this support 9 is withdrawn diagonally away from the cutter so as to move the edge of the strip 10 directly rearwardly the horizontal distance between successive rows of cutter bars as each row of cutter bars moves into the position previously occupied by the other set.

The strip is further supported by a table 8 arranged to move vertically downwards at the same rate as the support 9 so that the strip is always maintained in horizontal position. Further, means are provided for clamping the strip to the table during the cutting operation, these means being released during the upward movement of the reciprocating frame 2 to allow the sheet to be fed forward for the formation of a further series of meshes therein.

The various parts of the apparatus are mounted on a main frame 52 on top of which is journalled the main driving shaft 11, having mounted thereon fast and loose pulleys 12 and 13. At the other end of the shaft 11 is a gear 14 in mesh with a gear 15 on a shaft 16. The gears 14 and 15 provide the desired speed reduction to enable the desired shearing force to be obtained. On this shaft 16 are arranged a pair of eccentrics 17 provided with eccentric straps 18 connected at 19 to each end of the reciprocating frame 2. Suitable guiding means are provided on the frame of the apparatus for insuring linear, vertical movement of the frame 2. The table 8 is moved up and down at a slower rate than but synchronously with the slide 2 by means of eccentrics 20 on a shaft 21 connected to and driven from the shaft 16 by means of gear wheels 22 and 23. A strap 24 surrounding the eccentric 20 is connected at 25 to sliding block 26 secured to the table 8. As it is desirable to clamp the sheet to the table 8 during the cutting operation, particularly since the metal is not only slotted but also stretched, a clamp 27 is provided pivotally mounted at its ends on the block 26 by pins 28. Oscillation of the clamp about its pivots 28 is brought about by means of a bell crank 29, one arm of which is provided with a slot in which a pin 30 engages, while the other arm is provided with a roller which operates in a cam groove 31 in the face of a disk secured to the shaft 21. As the shafts 16 and 21 rotate in the direction of the arrows shown in Figure 3, it will be seen that the cam groove 31 causes the clamp 27 to grip the metallic strip or sheet during the downward movement of the frame 2 and to release the sheet during the upward movement of the frame so that the sheet may be pushed forward for the formation of a further series of meshes therein.

At its forward end the clamp 27 is preferably provided with a detachable strip 53 of hardened steel not only to facilitate replacement as the result of wear, but also to enable strips of different thickness to be employed to suit sheets of various thickness.

The support 9 is carried by a frame 54 resting at its ends on blocks 55 through the intermediary of wedges 56 provided with downwardly turned apertured ends 57 for the passage of a threaded stud 58. By adjusting nuts 59 and 60 on this stud 58, the position of the wedge and thereby the height of the frame 54 may be adjusted as desired. Horizontal movement of the frame 54 is prevented by tightening the nuts 61, after adjusting the wedges 56 to attain the desired height.

On its upper side the frame 54 is provided with an oblique bearing surface 62 on which the support 9 rests. The latter is held in sliding engagement with such surface by means of a plate 63 secured to the lower edge of the frame 54 by bolts 64. The support 9 is free to slide transversely but not longitudinally with respect to the frame 54.

Transverse movement of the support 9 is controlled by means of a channelled bar 32 slidably arranged within a channel in the upper surface of the frame 54. This sliding member is provided with stepped cam blocks 33 and 34, while on the support 9 are arranged cam blocks 35 adapted to extend between the cams 33 and 34 so that by moving the bar 32 longitudinally to and fro the support 9 is moved obliquely to and fro transversely with respect to the direction of movement of the bar 32. These cam surfaces are formed in a series of steps each of such height that the edge 10 of the member 9 is retracted horizontally the exact distance between the cutting edges of adjacent rows of cutters so that for all the rows of cutters the desired shearing action is obtained. Each of these cams 33 and 34 is provided with means for adjusting its position longitudinally on the bar 32, such as a stud 65 passing through an aperture in a lug 66 attached to the bar 32 and held in adjusted position relatively thereto by nuts 67. The cams 33, 34 and 35 are all detachable so that they may be replaced by others with different contour to suit different sized cutters. A longitudinal movement of the member 32 is provided by means of a bell crank rocker 70, the end 36 of one arm of which extends between a pair of lugs 37 secured to the end of the vertically reciprocating frame 2, while the end of the other arm 38 of the bell crank is adapted to engage one or other of two stops 39 and 40 adjustably mounted on the end of the bar 32. With this arrangement the frame 2, table 8 and support 9 move synchronously with respect to each other, so that the parts are always in cutting and supporting position. As shown in Figure 13, a certain amount of play is allowed between the end 38 of the bell crank 70 and the stops 38 and 39 to allow the support 9 to hesitate at start of upward movement of frame 2, so that hardened steel strip 10 will not drag on cutter bars 1, as frame 2 travels upward, giving clearance for meshes formed by preceding downward movement, and also hesitate at start of downward movement of frame 2, to bring hardened steel strip 10, as shown in Figure 8, in position to coact with the cutter bars 1, as downward movement of frame 2 continues. The diagonal rearward and downward movement of the support 9, prevents the upper row of cutters engaging the edge of the strip 10, as their ends are in the same vertical plane as the preceding, or next lower row, until it is desired to sever the sheet.

When desired the action of the foot on pedal 41 (Figure 1) produces a pull upon the cord 42 attached at 43 to the bell crank 44 pivotally secured to the frame 52 at 45. A spring 46 normally holds the bell crank with its arm 44 as shown in Figure 12.

The other arm 47 of the bell crank is connected at 48 to a bar 49 which is connected by means of studs 50 to blocks 51.

Pressure on pedal 41 moves blocks 51 in position under cam blocks 35 thereby holding support 9 against further rearward and downward movement and keeping the edge of strip 10 in the vertical plane of the edge of the two upper rows of cutters as shown in Figure 10, to completely sever the sheet.

The operation is as follows:

A sheet of metal 7 is placed on the table 8 and pushed forward as far as it will go. The machine is then set in operation whereupon the frame 2 descends. Simultaneously the cam 31, through the bell crank 29 and pin 30, forces the clamping member 27 downwards to firmly grip the plate.

As the first row of cutters reaches the plate they, in conjunction with the edge 10 of the support 9, by a shearing action slit the metal and simultaneously stretch the metal so separated from the body of the metal into the form of half a single mesh. When this has been accomplished the cams 33, 34 and 35 retract the support 9 so that it is in position to give the desired shearing support to the next row of cutters. This movement is brought about by the downward movement of the frame 2, through the bell-crank 70 and sliding bar 32.

The next set of cutters form slits staggered with respect to the first set of slits so that these cutters complete the formation of the meshes half made by the first set and also produce a new row of half meshes. The operation continues until the cutters have all passed the end of the sheet.

Then the eccentrics 17 raise the frame 2 with its cutters 1 and simultaneously the pin 30 raises the clamping member so that the sheet may be drawn forward by the upward and forward movement of the support 9. As the frame 2 begins to descend again the clamp moves down to grip the sheet in its new position and the operation proceeds.

When it is desired to cut off the sheet the pedal 41 is depressed thereby preventing retraction of the support 9 when the last set of cutters is reached so that both the last and the next to the last row of cutters come into operation completely severing the sheet.

I am aware that numerous details of construction may be varied through a wide range without departing from the principles of this invention, and I, therefore, do not purpose limiting the patent granted otherwise than necessitated by the prior art.

I claim as my invention:

1. An expanded metal machine comprising a vertically reciprocating frame, rows of diamond-shaped cutters on said frame, each row being offset rearwardly with respect to the row thereabove, means for reciprocating the frame, a table for supporting a sheet of metal horizontally, means for reciprocating said table in unison with the frame, means for supporting the portion of the sheet of metal in engagement with the cutters, and means for retracting such supporting means step by step as each row of cutters reaches such supporting means.

2. An expanded metal machine comprising a vertically reciprocating frame and a series of rows of cutter bars detachably secured thereto in a downwardly inclined position, the operative ends of each cutter bar lying in a substantially vertical plane.

3. An expanded metal machine comprising a vertically reciprocating frame, a series of cutters on said frame, each cutter being offset rearwardly with respect to the cutter thereabove, means for supporting the portion of the sheet of metal in engagement with the cutters, and means for retracting such supporting means step by step as each cutter reaches such supporting means.

4. An expanded metal machine comprising a vertically reciprocating frame, a series of rows of cutters on the frame, each row being offset rearwardly with respect to the cutter thereabove except the last row, means for supporting the portion of the sheet of metal in engagement with the cutters, means for retracting such supporting means step by step as each cutter reaches such supporting means, and means operable at will for preventing such retraction as the last row of cutters is reached to completely sever the sheet.

5. An expanded metal machine comprising a vertically reciprocating frame, a series of rows of cutters on the frame, each row being offset rearwardly with respect to the row thereabove, means for supporting the portion of the sheet of metal in engagement with the cutters, means for retracting such supporting means step by step as downward movement of the frame brings each row of cutters into contact with the sheet, means for moving the supporting means forward as the frame rises to feed a further portion of the sheet into the path of the cutters, and means for clamping the sheet against movement as the frame is depressed.

6. An expanded metal machine comprising a vertically reciprocating frame, a series of rows of cutters on the frame, an obliquely reciprocating sheet support, and means for operating the frame and support synchronously.

7. An expanded metal machine comprising a vertically reciprocating frame, a series of rows of cutters on the frame, a sheet support, a horizontal member reciprocated longitudinally and synchronously with the frame, and cam portions on the support and said member whereby reciprocation of the said member produces transverse oblique reciprocation of the support towards and away from the path of said frame.

8. In an expanded metal machine, a series of cutters, each having its cutting edge at a distance from that of its neighbor, a work support for cooperating with each of said cutters in turn, and means for moving said support from the position in which it cooperates with one cutter to the position in which it cooperates with the next cutter and so on step by step throughout the series.

9. In an expanded metal machine means including a reciprocating tool for forming a sheet of metal into expanded metal and manually controlled means operating at the end of the working stroke of said tool for severing the expanded metal from the unexpanded sheet.

In testimony whereof I have hereunto subscribed my name in the presence of two subscribing witnesses.

FRED C. AREY.

Witnesses:
CARLTON HILL,
EARL M. HARDINE.